United States Patent [19]

Hickson

[11] Patent Number: 4,937,024
[45] Date of Patent: Jun. 26, 1990

[54] METHOD FOR BONDING LIGNOCELLULOSIC MATERIAL WITH GASEOUS ESTERS

[75] Inventor: Charles H. Hickson, Delaware, Ohio
[73] Assignee: Borden, Inc., Columbus, Ohio
[21] Appl. No.: 371,457
[22] Filed: Jun. 26, 1989
[51] Int. Cl.⁵ .............................................. B29C 43/02
[52] U.S. Cl. ........................................ 264/83; 264/101
[58] Field of Search ............................ 264/83, 82, 101
[56] References Cited
U.S. PATENT DOCUMENTS
4,802,837 2/1989 Held ...................................... 425/230

Primary Examiner—Jan H. Silbaugh
Assistant Examiner—Mary L. Fertig
Attorney, Agent, or Firm—George P. Maskas; Dennis H. Rainear; Kenneth P. Van Wyck

[57] ABSTRACT

A method for bonding lignocellulosic material under heat and pressure together with steam and a gaseous ester wherein a mat of lignocellulosic material with a curable aqueous alkali solution of a phenol-formaldehyde resole binder is compressed between a pair of heated press platens to a first intermediate density and thickness, and condensable steam is injected into the mat through openings in said platens; the mat is then further compressed to a final density and thickness; and an ester in gaseous form is injected into said mat to cure a portion of the binder. Following the gaseous ester injection, the mat may be further injected with high pressure steam to cause further cure or elimination of uncured formaldehyde. A vacuum or exhaust is optionally applied to the mat through the platen opening to remove excess steam and other vapor, and the press is opened to remove the board formed from the mat.

13 Claims, 1 Drawing Sheet

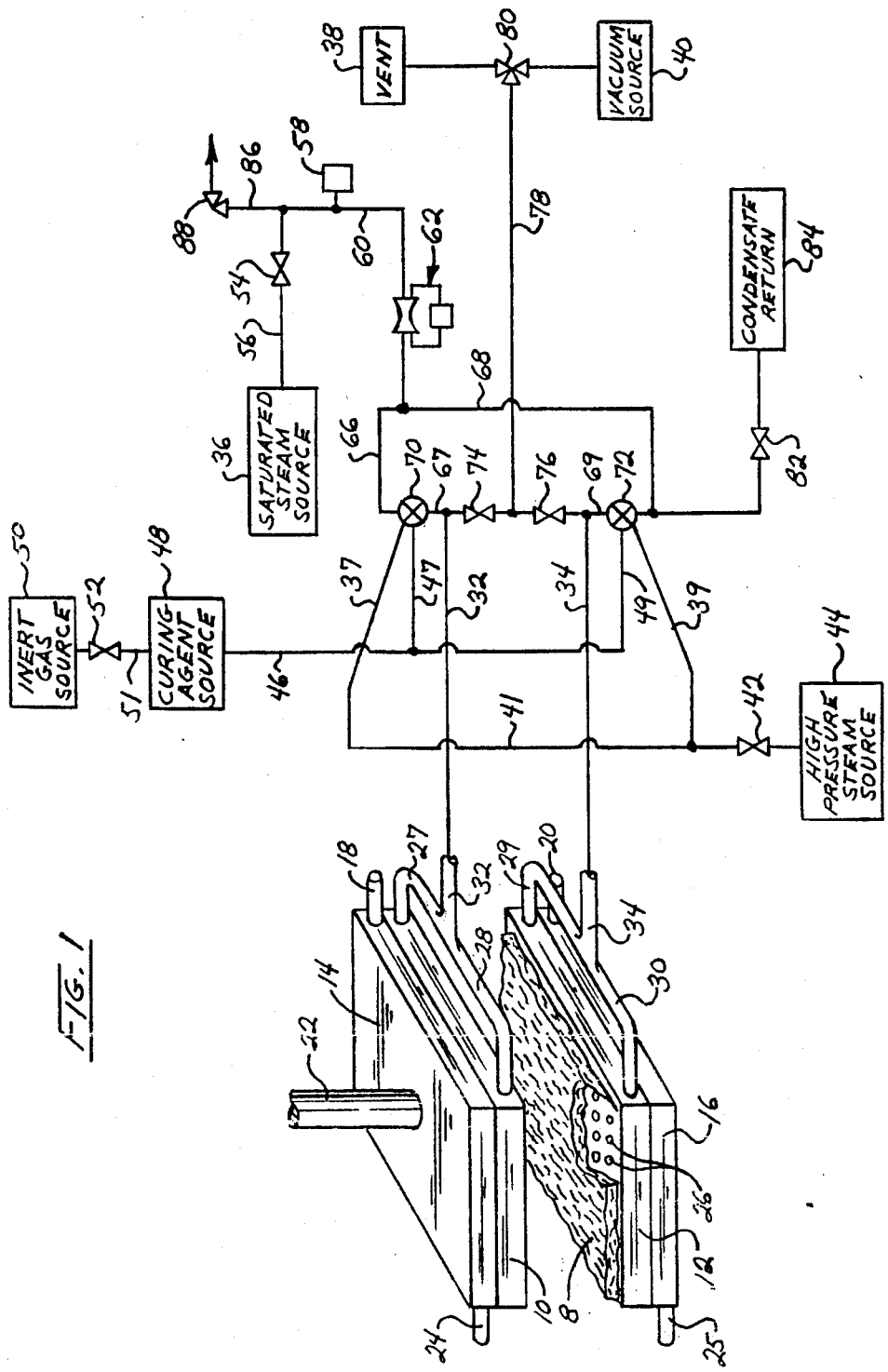

METHOD FOR BONDING LIGNOCELLULOSIC MATERIAL WITH GASEOUS ESTERS

BACKGROUND OF THE INVENTION:

The present invention relates to a method for bonding lignocellulosic material such as fibers, flakes, chips and strands in order to make panels such as those of fiberboard, flakeboard, chipboard, strandboard and hardboard. More particularly, the method utilizes a gaseous ester catalyst, generally in conjunction with steaming in a press.

Phenolic resins are widely used as adhesives and binders in many products, including structural wood products such as particleboard, fiberboard, oriented strandboard and the like. These phenolic resins are generally aqueous phenol-formaldehyde resole binders. The use of such binders is now limited by the cure speed of the binder in the hot presses. More recently, methods which use injection of live steam into the fiber mat as part of the hot press cycle have been used. The use of steam injection in a hot press provides for a more rapid cure of the binder as compared to the use of a hot press alone. However, phenolic resins have been generally unusable in steam injection presses. This is due to the phenolic resin bleed when steam pressure is applied. The phenolic resin thins to a flowable liquid and penetrates the furnish and migrates toward the edges of the panel, leaving a resin-starved center with low physical properties. Additionally, even with the steam injection press, the curing of the phenolic resin is substantially slower than with isocyanate binders.

In the production of panels from lignocellulosic material, a phenolic binder, e.g. phenol-formaldehyde resole, is mixed with the wood particles to form a mat. The mat is then placed between two platens and pressed into the composite panel. Conventionally, during pressing, heat is supplied to the mat to plasticize it, thereby making the mat easier to compress and also to cure the thermosetting binder. The time spent in pressing is the major bottleneck in the production of composite panels.

DESCRIPTION OF THE PRIOR ART:

Later methods for the production of such panels inject steam directly into the mat. Such methods are described in: U.S. Pat. No. 3,280,237 of Oct. 18, 1983; U.S. Pat. No. 3,891,738 of June 24, 1975; U.S. Pat. No. 4,393,019 of July 12, 1983; and U.S. Pat. No. 4,517,147 of May 14, 1985. Additionally, steam injection methods are described in the *Proceedings, 16th International Particleboard Symposium, W.S.U.*, 1982, in an article by R. L. Geimer, pp. 115-134, entitled "Steam Injection Pressing", and another article by R. L. Geimer and E. W. Price, pp. 367-384 in the *Proceedings, 20th International Particleboard/Composite Materials Symposium, W.S.U.*, 1986, entitled "Steam Injection Pressing—Large Panel Fabrication With Southern Hardwoods". Still, these steam injection processes are slow when using phenolic resins as compared to isocyanates and, as mentioned earlier, the phenolic is generally washed out of the furnish.

German patent No. 2,312,159 of Sept. 19, 1974 discussed a method for pressing chipboard wherein one or both pressing platens are provided with openings through which may be injected or exhausted fluid media which influence the pressing time or chipboard quality. Injection may be effected periodically according to a time schedule.

In the above mentioned U.S. Pat. No. 4,393,019, there is mention of the use of a gaseous catalyst being injected into the mat in conjunction with steaming to accelerate the cure. That patent mentions that the cure of phenolic resins may be catalyzed with ammonia and strong amines such as trimethylamine.

Broadly, various liquid catalysts for accelerating or curing phenolic resins in wood products are well known such as the use of liquids having ester functionality, as shown in the following publications: Federal Republic of Germany Patent No. 1,653,266 of Jan. 11, 1967; French Patent No. 1,550,847 of Jan. 11, 1987; Federal Republic of Germany Pat. No. 1,065,605 of Sept. 17, 1959; U.S. Pat. No. 3,949,149 of Apr. 6, 1976; and Japan (Sho) No. 49-40392 of Apr. 15, 1974. Additionally, pending U.S. patent applications Ser. No. 149,102 filed Jan. 27, 1988 and its parent applications to Detlefsen, et al., and U.S. Ser. No. 102,665 filed Sept. 30, 1987 to Stratton, et al. show the use of liquid compounds having ester functionality. Liquid esters such as those in the Detlefsen application can be used with phenolic resins in the steam injection press. When the steam is applied, however, the ester causes the resin to thicken and in some cases, the phenolic resin will start thickening before steam is applied, if the dwell time after application is long enough. Gassing of foundry molds which use phenolic resins as binders with much the same esters as those of this invention is shown by U.S. Re. No. 32,710 of July 26, 1988 to Lemon, et al.

SUMMARY OF THE INVENTION:

This invention relates to a method for accelerating the cure of aqueous, alkaline, phenol-formaldehyde resole resins (PF resins) in lignocellulosic mats for the production of composition boards or panels by the use of ester curing agents in gaseous form. The ester curing agents useful herein generally have a boiling point of less than about 85° C. The esters can be applied alone or in conjunction with heated platens and steam. In a preferred embodiment, a mat of lignocellulosic material containing a PF resin is placed between heated platens of a press suitable for steam injection of the mat. Saturated steam is then injected into the mat from said platens while the mat is pressed to an intermediate density and thickness; the mat is further compressed between said platens to a higher density and lower thickness to further consolidate the mat; the mat is then gassed with said ester in a quantity sufficient to cure at least a portion of said resin; and high pressure steam is injected into the mat from said platens to further cure the resin or remove free formaldehyde. The press time for forming panels with this invention is very short, such as that of less than about one hundred seconds for a three-quarter inch panel, e.g. a panel of oriented strandboard.

Accordingly, an object of this invention is to provide a rapid method for curing lignocellulosic mats with PF resin binders. It is a further object to cure such mats having a phenolic resin binder very rapidly with esters in gaseous form having a boiling point of less than 85° C. In this method, the mat can be softened by heat from the platens before curing with the ester, or the mat softening can be accomplished with steam together with the heated platens prior to gassing with ester. In a preferred process, the ester is injected into the mat with a steam carrier. It is a still further object of this invention to provide composition panels using PF resin binders wherein the panel has good physical properties with the release of only small quantities of formaldehyde.

BRIEF DESCRIPTION OF THE DRAWINGS:

FIG. 1 is a schematic diagram showing the elements in the ester gassing system.

DESCRIPTION OF THE PREFERRED EMBODIMENT:

The composite panels of this invention are made from lignocellulosic material in fiber form, flake form, particulate form, strand form and other forms known in the industry, and produce boards or panels such as that of fiberboard, waferboard, strandboard, flakeboard, particleboard and the like.

This invention solves problems in the use of steam presses for curing lignocellulosic composite panels with a phenolic resin binder and provides a faster cure than otherwise attainable. Problems in the prior art, such as bleeding of the phenolic resin, are eliminated by gassing with the esters. The gassing provides a very fast cure for the phenolic resin binder and at the same time, permits advantages inherent in the steam injection press. In this invention, the phenolic resin and gaseous curing agent are added separately and therefore, there is no thickening or partial curing of the resin as found with liquid esters which are added to the liquid resin before spraying on the furnish. Contact of the curing agent and the phenolic in this invention occurs after the mat is in the press under some pressure. This means that the pre-cure life of the mixture of furnish and phenolic resin is extended. The gaseous curing agents of this invention cure in about the same time frame as isocyanates, i.e. almost instantaneously. The use of the gaseous ester curing agents could eliminate the isocyanate health hazard.

FIG. 1 is a schematic depiction of one embodiment of the pressing system used in this invention. It shows a pair of press platens 10, 12 spaced from each other with an opening therebetween. Typically, press platens are large, substantially flat metal plates fixed to a supporting structure, and have internal conduits for the flow of gas. The platens are constructed and incorporated into a hot pressing system substantially according to known methods. One or both platens of an opposing pair are movable toward and away from each other in order to open and close the press. When the press is open, the mat 8 of composite material, comprising the composite particles or furnish coated with the phenolic resin binder, is inserted into the press through known loading means (not shown) and deposited atop the bottom platen 12. Typically, platens are opened and closed through suitable closure means using hydraulic cylinders such as ram 22 of a cylinder (not shown).

At an upstream forming station (not shown), the lignocellulosic material and phenolic resin are formed into a mat having the predetermined basis weight in order to provide a loosely compacted mat 8 with the right bulk density for pressing into panels that will have a predetermined thickness and density. Platens 10, 12 can be heated by a pair of backup platens 14 and 16 through which steam or hot oil flows by means of inlet pipes 18 and 20 and outlet pipes 24 and 25 respectively. These backup plates provide heat to the platens 10 and 12, and the temperatures of the platens 10 and 12 can vary from about room temperature to about 450° F. or preferably from about 300° to 420° F. The opposed faces of platens 10, 12 are substantially identical and have a plurality of apertures 26 connected to gas source 32, 34 by means of manifolds 27, 28, 29 and 30 so that gas, by means of conduits (not shown) in platens 10 and 12, flows through the apertures 26 of one or both of the platens into mat 8.

The various gasses, such as high pressure or saturated steam, and gaseous ester, alone or in a carrier, are introduced into the mat 8 through valves 70 and 72 and lines 32, 34 and manifolds 27, 28, 29 and 30 from source 36 for the saturated steam; source 44 for the high pressure steam; and source 48 for the curing agent.

The valving system serves to control the application of the gasses, the type of gas, its pressure at the mat surfaces and time duration. Temperature sensing means (not shown) control the temperature of the platens and gasses. The valving system, the press closure means and the steam or other gas system pressure can be controlled and programmed through a small computer or with the use of several microprocessors. The press closure means is functional to move backup platens 14 and 16 which in turn move platens 10 and 12 in a controlled manner from the open position to the fully closed position of the press with the ability to hold positions and vary the closure rates in order to carry out the steps of this invention. The closed position of the press is that position when the mat has been compressed to its final predetermined in-press thickness. The valving system also controls the venting and application of the vacuum to the surfaces of the mat. A saturated steam supply control valve 54 allows steam at a suitable predetermined temperature and pressure to enter the pressing system from source 36 through line 56. A suitable measuring device in line 60, indicated schematically at 58, serves to detect the pressure and temperature in order to properly control the steam source 36. Flow measurement means 62 detects the flow rate of the saturated steam in line 60. At the T-joint in line 60, saturated steam line 66, through valve 70, and gas line 67, line 32 and the manifolds, is directed to the top platen 10 and a steam line 68 is directed to the bottom platen 12 through valve 72, gas line 69, line 34 and the manifolds 29 and 30. Gas valves 70 and 72 serve to open and close lines 66, 68 as well as lines 37, 47, 39 and 49 as various gasses are called for. Line 66, through valve 70 and line 67, flows into line 32, which is then divided at another T-joint and lines or manifolds 27 and 28 are directed to opposite sides of upper platen 10. The top platen gas inlet temperature and pressure are measured by any suitable means (not shown). The platen temperature is also measured and controlled since it is maintained a few degrees hotter than the maximum injection steam temperature to prevent steam condensation in the platen.

Steam from line 68, through valve 72 and gas line 69, flows into line 34 which is likewise divided into separate flow lines or manifolds 29, 30 which are directed to opposite sides of bottom platen 12. Similarly, as with upper platen 10, the inlet gas temperature, pressure and platen temperature are detected for monitor control purposes and suitable signals sent to the process control system. Exhaust valves 74, 76 are controllable and when open, connect the platens to exhaust line 78 which is directed to a three-way valve 80 which is either open to vacuum source 40 or to atmosphere at 38.

Line 82 serves to divert condensate developed in the various gas lines which are controlled by valves 70, 72. Branching from steam line 60 after supply valve 54 is line 86 which leads to a pressure safety valve 76.

High pressure steam is also let into valves 70 and 72 which, in turn, eventually lead fluid into the upper and lower platens 10, 12 respectively, through branch lines 37 and 39 respectively, which branch off from line 41. The steam in line 41 is controlled through valve 42 at the high pressure steam source 44. These high pressure steam lines also have monitors, gauges, safety valves and are controlled with valve 42 by the control means (not shown).

Numeral 50 represents a carrier gas source such as saturated steam, high pressure steam, air or nitrogen which can pass through valve 52 into ester curing source 48, where it picks up ester and carries it into line 46. Line 46 has a first T-joint with one arm going into upper platen valve 70 and eventually to the upper platen 10, and the second arm going into valve 72 and eventually into the lower platen 12. As with the other gasses introduced into the platens 10 and 12, the ester or the ester together with a carrier gas such as steam is injected into the mat furnish 8 through apertures 26 of the upper and lower platens. Not shown in the ester curing system are temperature, pressure, and safety valves which are controlled in much the same manner as described for the saturated steam system.

The lignocellulosic material is bound with a phenolic resole resin. Such resins are conventionally used in the manufacture of structural wood products. Typically, the molar ratio of formaldehyde or other aldehyde to phenol or other phenol derivative in these phenolic resins is about 1.5:1 to 3:1. The resin is in the form of an aqueous solution and has an alkalinity content, i.e. contains a base, in the range of 0.5% to about 15%, preferably 1% to 12%, and particularly 2% to 8%, based on the weight of the resin solution, when the base is sodium hydroxide. When a different base is used, the alkalinity content is proportionally equivalent on a molar weight basis. For example, to attain a 4% sodium hydroxide equivalent weight alkalinity content, it requires 4 grams of sodium hydroxide in 100 grams of resin solution, but 5.61 grams of potassium hydroxide in 100 grams of the resin solution are required to attain the same alkalinity content. Additional base can be added to a commercial resole resin in order to bring it to the desired alkalinity content. The base may be an alkali metal or alkaline earth metal compound such as a hydroxide or oxide.

The phenolic resin solution used in this invention will have a resin solids content of about 40% to 75% by weight, preferably about 40% to 60%. Generally, the viscosity should be such as to permit the phenolic resin solution to be sprayed on the furnish or to otherwise coat the particles of furnish as is conventional in the art. Thus, the viscosity will generally vary from about 100 to about 250 centipoise at 25° C as determined by a Brookfield RVF viscosimeter with a number 2 spindle at 20 revolutions per minute at 25° C.

The "phenolic resins" useful herein are those resins which may be obtained by the reaction of phenol, cresol, resorcinol, 3,5-xylenol, bisphenol A, other substituted phenols or mixtures thereof with aldehydes such as formaldehyde, acetaldehyde or furaldehyde. The reaction of the phenol or phenol derivative with aldehyde for the phenolic resins used in this invention takes place in the presence of alkaline materials such as sodium or potassium hydroxide.

The amount of phenolic resin used as a binder for the lignocellulosic material will generally depend on the characteristics required in the final product. Generally, the amount of binder can vary from about 2% to about 8% of resin solids based on dry finished board weight. More resin solids than 8% can be used, but a greater amount presently is not cost efficient. The PF binder used in this invention is generally composed of the phenol-aldehyde resole resin, water and a basic material such as sodium hydroxide.

The ester curing agent for the PF resin has a boiling point of less than 85° C. Generally, these are lower alkyl formates or acetates with a total of 2 to 4 carbon atoms. Illustrative of the ester curing agent there can be mentioned methyl formate, methyl acetate, methyl propionate, ethyl formate, ethyl acetate and mixtures thereof. At lest a portion of the cure for the PF resin is accomplished by gassing with the ester. The ester will not usually be used as a pure gas, but as a vapor or aerosol in an inert carrier gas. By "inert carrier gas" is meant a gas which does not have an adverse effect on the curing reaction or the properties of the product. Suitable inert carrier gasses include, for example, air, nitrogen and steam.

The quantity of ester catalyst used for curing the phenolic resin is from about 5% to 60% based on the weight of the PF binder. Preferably, the ester catalyst is methyl formate and it is used in a quantity of about 20% based on the weight of the phenolic resin solution. In order to entrain a sufficient amount of the ester in the gas phase for effective cure, the ester is heated to near its boiling point and is carried by a stream of the carrier gas which is also preheated, e.g. to about 100° C. The preferred carrier gas is steam.

An alternative to true vaporization of the ester is to form an aerosol in the carrier gas, although methyl formate is so volatile as to make this impractical if it is the catalyst to be used. A practical advantage for the use of the ester curing agents, especially methyl formate, is their relative low toxicity and the fact that their toxicity is well understood.

The concentration of the ester catalyst in the carrier gas is preferably at least 0.2% by volume, and typically from 0.5% to 5% by volume. The total amount of catalyst used will typically be from 5% to 60%, preferably from 15% to 35%, by weight based on the weight of the phenolic resin solution. The time required for adequate gassing depends on the size of the lignocellulosic mat, the particular resin used as well as the specific ester curing agent and temperatures involved. However, the time for adequate gassing with ester can be as short as 0.1 second, but more usually is in the range of about 0.5 second to 20 seconds. Excess ester curing agent can be recovered, such as by pulling a vacuum on the compressed mat while in the press. Another method for recovery of the ester is by injecting the ester through the bottom platen only, and allowing the unused gas to push up through the mat to the openings of the top platen to be collected by vacuum. Alternatively, only the amount needed, or a slight excess, of the ester can be used so that there is little or no excess of the curing agent to recover.

It is estimated that the reduction in press time of one second in a 90 million square feet per year, three-quarter inch basis particleboard plant can result in an increase of $35,000 in annual sales. Illustrative of the improved cure time for three-quarter inch thick oriented strandboard bound with a phenolic resin, it takes a press time of about seven minutes with conventional heated platens; six to six and one-half minutes with liquid ester curing agent in the conventional heated platens; about two minutes in a steam injection press; and it is estimated that it will typically take only about 50 seconds of press time with the gaseous ester curing agents.

Still another advantage of this invention, when steam is applied to the mat after gassing with the ester, is that formaldehyde emissions can be reduced. Another important advantage is that of curing thick boards, such as 5 inch, 6.5 inch or even thicker boards, in a very short time.

The press time of this invention is very short and can vary from about 20 seconds to 120 seconds, preferably 40 to 80 seconds for a three-quarter inch thick panel. Press time is defined herein as beginning when the mat has been compressed in the press to a density of 20 lb./ft.$^3$ (320 kg./m.$^3$) or at the time steam is first injected, if this occurs prior to reaching 20 lb./ft.$^3$ (320 kg./m$^3$) and ending at the moment the press begins to open. Preferably, steam is injected into the mat in conventional manner, such as prior to compression of the mat to a density of 27 lb./ft.$^3$ (432 kg./m$^3$). Also, the final density of the mat and panel pressure is that which is conventional in the art of forming composite panels.

The following description further illustrates this invention for making a three-quarter inch thick composite panel. Round wood (Aspen or Gum) is milled into wafers or strands and dried in a drier with inlet temperature of 900° F. and outlet temperature of 600° F. There are normally three passes of the furnish in the dryer with a one minute total dwell. The average moisture of the furnish going into the dryer is 30% to 40% and coming out is 2% to 5%. The furnish is then sent to the blender for the phenolic resin solution application. The phenolic resin solution application is typically about 3.4%, applied as a fine mist and the sprayed furnish is transferred to the formers. The phenolic used can be CASCOPHEN IN-14. This phenolic resin is a product of Borden Packaging & Industrial Products, a Division of Borden, Inc., and has a 2.3-2.4 mole ratio of formaldehyde to phenol, a 56% resin solids content and a viscosity (Brookfield RVF #2/20 rpm./25° C.) of 175±75 and Specific Gravity 25°/25° C. of 1.247±0.010. At the formers, the face layer is laid down and oriented in the machine direction, then the core is laid down and this is oriented in the cross machine direction, followed by the face oriented in the machine direction. The orientation can be mechanical or electrostatic. This layered mat, which may be compressed to a density of about 8 to about 20 pounds per cubic foot, is then sent to the press. The mat is placed on the lower platen and the top platen is lowered to just before the final thickness is achieved, i.e. just to before the press stops are reached and at mat density of about 23 pounds per cubic foot. The platens are heated to a temperature of 440° F. Then low pressure steam of 1 to 2 atmospheres is injected into the mat through both the top and bottom platens for a period of about six seconds. The press is then brought to full stops, i.e. the final in-press thickness of the mat, which generally involves over 32 pounds of density per cubic foot, and gaseous ester catalyst entrained in low pressure steam is injected into the mat for two seconds. The thickness of the mat is three-quarters of an inch at the full stops. The quantity of ester used is about 20% based on the phenolic resin binder solution used in the mat. Immediately following the ester gassing, high pressure steam is applied at, for example, 4 atmospheres for eight seconds. Then the pressure is reduced to just hold, without significantly affecting the mat thickness, at the stops, and a vacuum is applied for six seconds to remove a great deal of the steam and other gasses. The press is then opened and the board removed. The press time involved in this illustration is about 30 seconds.

What is claimed is:
1. A method for preparing a panel from a mat of lignocellulosic material and an alkaline phenolic resin resole binder which comprises:
   (a) placing said mat between platens of a press wherein at least one of said platens has perforations on its face opposing the other platen for the passage of a gas through said perforations;
   (b) injecting steam into said mat;
   (c) compressing the mat between the platens, while said platens are heated to a temperature above 100°C.; and
   (d) injecting a gaseous ester having a boiling point of less than 85°C. into said mat from said platen openings to cure the binder after injection of said steam.
2. The method of claim 1 wherein the steam is saturated steam.
3. The method of claim 2 wherein superheated steam is injected into the mat after gassing with the ester while the mat is still under pressure between said platens.
4. The method of claim 1 wherein the ester is admixed with steam prior to injection of said ester into the mat.
5. The method of claim 1 wherein the phenolic resin binder is that produced by the combination of phenol and formaldehyde.
6. A method for preparing a panel from a mat of lignocellulosic material and an alkaline phenol-formaldehyde resole binder which comprises:
   (a) placing said mat between perforated platens heated to at least 100° C., said perforations being suitable for the passage of a gas therethrough;
   (b) compressing said mat between the platens to a first density within an intermediate density range which is less than a final density and a first thickness within an intermediate thickness range which is greater than the first thickness;
   (c) injecting saturated steam into at least one major surface of said mat from said platen perforations while the mat is within the intermediate density and thickness ranges;
   (d) compressing the mat to a higher density and lower thickness to further consolidate the mat and injecting a gaseous methyl or ethyl formate from said platen perforations into the mat in a quantity sufficient to at least partially cure said binder; and
   (e) injecting high pressure steam into the mat from said platen openings while the mat is at substantially its latter thickness range to further cure said binder.
7. The method of claim 6, wherein the lignocellulosic material is in the form of strands, flakes, wafers or fibers.
8. The method of claim 7 wherein a vacuum is drawn through the openings of at least one of the platens after the high pressure steam curing.
9. The process of claim 6 wherein the ester gassing is effectuated by a mixture of ester and steam.
10. The process of claim 9 wherein the time period from the start of the saturated steaming step through the high pressure steaming step is less than two minutes.
11. A method for preparing a panel from a mat of particulate lignoellulosic material and an alkaline phenol-formaldehyde resole binder wherein the binder has a formaldehyde to phenol molar ratio of about 2:1 to

2.7:1, a solids content of 45% to 60% and an alkalinity content of about 2% to 8%, which comprises:
(a) placing said mat between perforated platens heated to a temperature above 100° C., said perforations being suitable for the passage of a gas therethrough and into said mat;
(b) compressing said mat between the platens to an intermediate thickness which is less than the final thickness of the mat in said press;
(c) injecting saturated steam into at least one major surface of said mat from said platen perforations while the mat is within the intermediate thickness;
(d) compressing the mat to a final in-press thickness which is less than said intermediate thickness and injecting a mixture of methyl formate carried by steam at a concentration of about 0.5% to 5% by volume of said methyl formate in said mixture from said platen perforations into the mat to cure said binder; and
(e) injecting high pressure steam into the mat from said platen perforations after injection of said ester mixture and while the mat is at substantially its final in-press thickness range.

12. A method for preparing a panel from a mat of lignocellulosic material and an alkaline phenolic resin resole binder which comprises:
(a) placing said mat between heated platens of a press wherein at least one of said platens has perforations on its face opposing the other platen for the passage of a gas through said perforations;
(b) injecting steam into said mat;
(c) compressing the mat between the platens; and
(d) injecting a gaseous ester having a boiling point of less than about 85° C. from said platen openings into the steamed and compressed mat to cure the binder.

13. A method of claim 1 wherein the gaseous ester is methyl formate.

* * * * *

UNITED STATES PATENT AND TRADEMARK OFFICE
CERTIFICATE OF CORRECTION

PATENT NO. : 4,937,024
DATED : June 26, 1990
INVENTOR(S) : Charles H. Hickson

It is certified that error appears in the above-identified patent and that said Letters Patent is hereby corrected as shown below:

In column 8, line 39, delete "first" and insert -- final -- therefor,

In column 9, line 8, delete "less" and insert -- greater -- therefor.

Signed and Sealed this

Eighth Day of October, 1991

Attest:

HARRY F. MANBECK, JR.

*Attesting Officer*     *Commissioner of Patents and Trademarks*